(12) United States Patent
Uppili et al.

(10) Patent No.: US 8,262,902 B2
(45) Date of Patent: Sep. 11, 2012

(54) MAGNETIC REMOVAL OF MATERIAL FROM A MIXTURE BASED ON SULFIDED DILUENT IN THE MIXTURE

(75) Inventors: Sundararajan Uppili, Bartlesville, OK (US); Donald R. Engelbert, Copan, OK (US)

(73) Assignee: Phillips 66 Company, Houston, TX (US)

(*) Notice: Subject to any disclaimer, the term of this patent is extended or adjusted under 35 U.S.C. 154(b) by 471 days.

(21) Appl. No.: 12/707,073

(22) Filed: Feb. 17, 2010

(65) Prior Publication Data

US 2010/0206774 A1 Aug. 19, 2010

Related U.S. Application Data

(60) Provisional application No. 61/153,848, filed on Feb. 19, 2009.

(51) Int. Cl.
*C10G 11/05* (2006.01)

(52) U.S. Cl. ... 208/113; 208/106; 208/119; 208/120.01; 209/212; 209/213; 209/214; 502/77; 502/78; 502/79; 502/407; 502/415

(58) Field of Classification Search .......... 209/212–232, 209/636; 208/106, 113, 119, 120.01; 502/77–79, 502/407, 415
See application file for complete search history.

(56) References Cited

U.S. PATENT DOCUMENTS

| 4,263,128 A * | 4/1981 | Bartholic ................ 208/91 |
|---|---|---|
| 4,283,204 A | 8/1981 | Savage |
| 5,230,869 A | 7/1993 | Hettinger et al. |
| 5,328,594 A | 7/1994 | Hettinger |
| 5,393,412 A | 2/1995 | Hettinger |
| 5,538,624 A | 7/1996 | Hettinger |

* cited by examiner

*Primary Examiner* — Brian McCaig
(74) *Attorney, Agent, or Firm* — Phillips 66 Company

(57) ABSTRACT

Methods and apparatus relate to processing of petroleum with a bed having a sorbent based diluent that the petroleum contacts upon passing through the bed. Magnetic properties of the sorbent and any other material, such as zeolite, used in the bed enable separation of such bed constituents based on a sulfided form of the sorbent being magnetic in contrast to a non-sulfided form of the sorbent being non-magnetic. Dividing the bed constituents into first and second portions by magnetic separation facilitates in selective replacing and/or regenerating the first portion independent of the second portion.

14 Claims, 2 Drawing Sheets

MAGNETIC REMOVAL OF MATERIAL FROM A MIXTURE BASED ON SULFIDED DILUENT IN THE MIXTURE

CROSS-REFERENCE TO RELATED APPLICATIONS

None

FIELD OF THE INVENTION

Embodiments of the invention relate to methods and systems for magnetic removal of material from a mixture based on sulfided diluent in the mixture, which may be used for refining petroleum.

BACKGROUND OF THE INVENTION

Simple distillation of crude oil produces straight run naphtha which is lean in octane number. In one approach to upgrade the naphtha stream and remove impurities from the naphtha stream, the processing utilizes a combination of a zeolite additive and a sorbent based diluent both mixed together within a fluidized bed. During the processing to produce octane rich gasoline, the straight run naphtha stream passes through the fluidized bed that contains the combination of the zeolite additive and the sorbent based diluent.

The zeolite additive functions as a catalyst for reactions in which constituents of the naphtha stream yield products that improve octane of the naphtha stream. In addition, the sorbent based diluent adsorbs sulfur-containing compounds from the naphtha stream. The processing of the straight run naphtha stream to octane rich gasoline thereby relies on the combination contained within the fluidized bed having suitable mixture ratios of the zeolite additive to the sorbent based diluent.

Both the zeolite additive and the sorbent based diluent deactivate during use and require replacement with active materials for each. However, the zeolite additive deactivates by a different mechanism and at a different rate than the sorbent based diluent. Due to prior limitations regarding selectiveness, changing out any portion of the combination without disaggregation can lead to waste given that only one of the zeolite additive and the sorbent based diluent may be spent but is not separately replenished within the combination.

Therefore, a need exists for improved methods and systems for processing of petroleum with a bed that contains a component to be replenished.

SUMMARY OF THE INVENTION

In one embodiment, a method of processing petroleum includes contacting in a reactor a solid particulate mixture with a hydrocarbon-containing feed stream. The solid particulate mixture includes a sorbent and a catalyst. The sorbent includes a nickel-containing material and adsorbs sulfur from the hydrocarbon-containing feed stream. The catalyst includes a zeolite and catalyzes reactions that increase octane of the hydrocarbon-containing feed stream. Removing at least part of the mixture from the reactor provides a removed portion of the mixture. Separating the sorbent from the catalyst within the removed portion occurs by magnetic separation. The method further includes processing independent of one another the sorbent and the catalyst that are separated. The mixture within the reactor is replenished with at least one of the sorbent and the catalyst that is recycled from the removed portion.

According to one embodiment, a method of processing petroleum includes contacting in a reactor a hydrocarbon-containing feed stream with a solid particulate mixture having a nickel-containing sorbent. The sorbent adsorbs sulfur-containing compounds from the hydrocarbon-containing feed stream. Magnetism of the sorbent depends on sulfur content of the sorbent. Separating at least part of the mixture produces first and second portions based on magnetic properties of particles within the mixture. In addition, the method includes processing independent of one another the first portion and the second portion that are separated. The mixture within the reactor is replenished with the sorbent that is recycled.

For one embodiment, a system for processing petroleum includes a reactor containing a solid particulate mixture. The solid particulate mixture includes a sorbent and a catalyst. The sorbent includes a nickel-containing material and is capable of adsorbing sulfur from a hydrocarbon-containing fluid. The catalyst includes a zeolite and is capable catalyzing reactions that increase octane of the hydrocarbon-containing fluid. A magnetic separator coupled to receive a portion of the mixture separates the sorbent from the catalyst within the portion. Processing equipment replenishes the mixture within the reactor with at least one of the sorbent and the catalyst that is recycled from the portion. The processing equipment couples to the magnetic separator to process independent of one another the sorbent and the catalyst that are separated by the magnetic separator.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to processing of petroleum with a bed having a sorbent based diluent that the petroleum contacts upon passing through the bed. Magnetic properties of the sorbent and any other material, such as zeolite, used in the bed enable separation of such bed constituents based on a sulfided form of the sorbent being magnetic in contrast to a non-sulfided form of the sorbent being non-magnetic. Dividing the bed constituents into first and second portions by magnetic separation facilitates in selective replacing and/or regenerating the first portion independent of the second portion.

Figure 1:
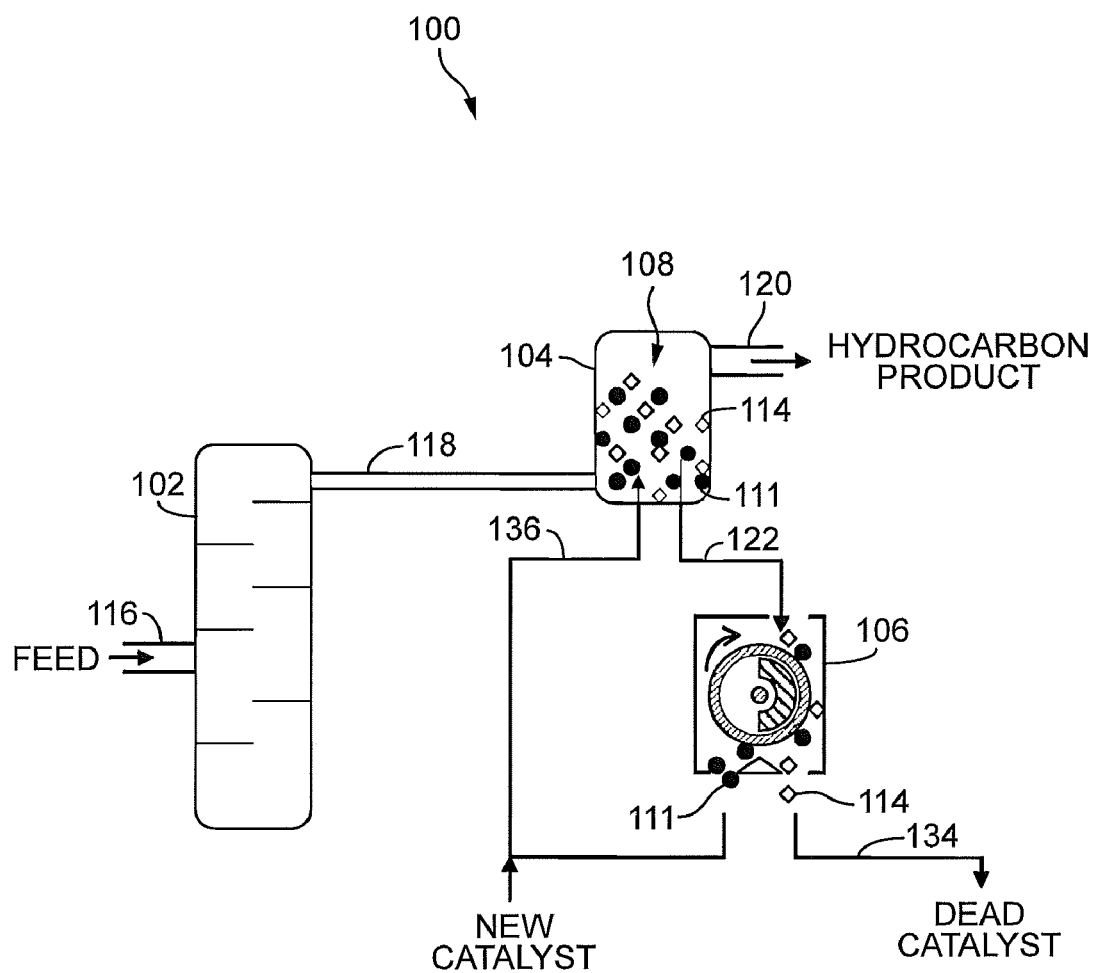
FIG. 1 is a schematic of a refining system having a magnetic separator coupled to a bed of the system and operable to facilitate selective catalyst replacement within a mixture from the bed through which a feed stream passes, according to one embodiment of the invention.

FIG. 1 shows a simplified schematic of a refining system 100 having a distillation column 102 coupled to a reactor, such as a fluidized bed reformer 104. The system 100 further includes a magnetic separator 106 to divide a material mixture 108 utilized within the reformer 104. The simplified schematic and accompanying description omits various optional details such as those described with respect to FIG. 2.

For some embodiments, an input 116 provides a flow path for introducing a feed stream of crude oil into the distillation column 102. The crude oil separates in the distillation column 102 based on boiling points to form a naphtha stream 118 that passes through the reformer 104 to an output 120. For example, fluids from the feed stream with boiling points in the range 32-220° C. may define the naphtha stream 118. Modification of the naphtha steam 118 occurs as the naphtha stream contacts the material mixture 108 within the reformer 104. Zeolite 114 (depicted by diamond shapes), for example, causes reactions in which constituents of the naphtha stream 118 yield products that enhance octane of the naphtha stream. Contents of the output 120 thereby define hydrocarbon products, such as octane rich gasoline, produced by upgrading of the straight run naphtha stream 118 upon passing through the reformer 104.

As described further herein, the mixture 108 that enters the separator 106 from the reactor 104 via withdrawal pathway 122 contains a non-magnetic catalyst, such as the zeolite 114, and a magnetic diluent 111 that may be a sulfur and nickel or nickel oxide containing compound. The magnetic separator 106 separates the zeolite 114 from the magnetic diluent 111. Due to this separation, a catalyst discard pathway 134 removes only the zeolite 114 from the mixture 108 once the zeolite 114 is permanently dead and no longer able to be regenerated. As depicted by replenishing pathway 136, the magnetic diluent 111 divided out by the separator 106 along with new catalyst resupply the reactor 104. Since the magnetic diluent 111 is not discarded with the zeolite 114 but rather recycled back to the reactor 104, this separate processing of the magnetic diluent 111 and the zeolite 114 avoids unnecessary costs associated with replacing the magnetic diluent 111.

Figure 2:
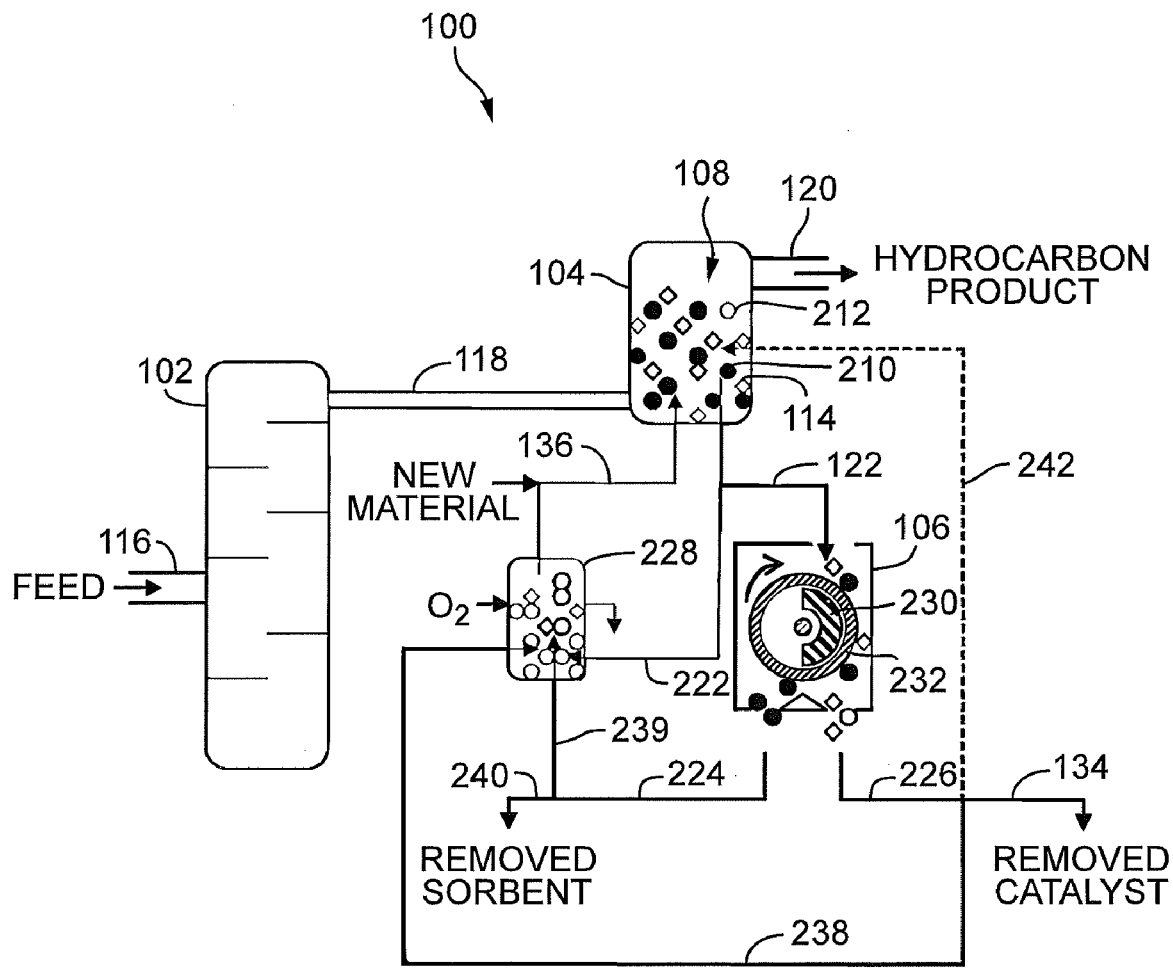
FIG. 2 is a more detailed schematic of the refining system showing processing options for the mixture after magnetic separation based on a sulfided state of sorbent within the mixture, according to one embodiment of the invention.

FIG. 2 illustrates various additional details and alternative configurations of the refining system 100. Loading of an active sorbent 212 (depicted by open circle shapes) with sulfur-containing compounds creates sulfided sorbent 210 (depicted by filled circle shapes), which may form the magnetic diluent 111 identified in FIG. 1. In operation, the active sorbent 212 adsorbs sulfur or sulfur-containing compounds from the naphtha stream 118.

As the naphtha stream 118 passes through the reformer 104, the zeolite 114 acts to crack and isomerize straight chain paraffins and thereby make olefins, isoparaffins and aromatics, which have relatively higher octane numbers. The octane number of the naphtha stream 118 may increase after passing through the reformer 104. Since degree of cracking depends on quantity of the zeolite 114, excess amounts of the zeolite 114 within the reactor 104 can result in producing smaller hydrocarbon molecules than desired. The active sorbent 212 and/or the sulfided sorbent 210 thus dilute the zeolite 114 within the reactor 104 to limit amount of cracking Quantities for the zeolite 114 and the sorbents 210, 212 may establish a zeolite to sorbent ratio within the mixture 108 of about one-to-one (1:1), for example.

The active sorbent 212 differs from the zeolite 114. In some embodiments, the active sorbent 212 includes zinc oxide and one or more metallic promoters, such as a combination of nickel and cobalt, in a zero valence state to selectively remove sulfur compounds from the naphtha stream 118. U.S. Pat. No. 6,429,170 describes an exemplary composition for use as the active sorbent 212 and is hereby incorporated by reference in its entirety.

For some embodiments, the mixture 108 includes a plurality of individual solid particles for the sorbents 210, 212 and a plurality of individual solid particles for the zeolite 114. Properties of the solid particles making up the mixture 108 permit fluidization and circulation of the mixture 108. These particles can have a mean particle size less than 500 microns. The mixture 108 circulates in the system 100 to provide in the reformer 104 substantially continuous octane enhancement of the naphtha stream 118 and removal of sulfur-containing compounds from the naphtha stream 118.

While the catalyst is described as being the zeolite 114, amorphous cracking catalysts, such as those of the silica-alumina or silica-magnesia types, are also suitable. The zeolite 114 may include any zeolite-type catalyst with about 0.5 to about 50 weight percent, or about 3 to about 30 weight percent, of a zeolitic crystalline aluminosilicate or borosilicate component distributed throughout a porous matrix. Exemplary forms of the zeolite 114 include faujasite, chabazite, mordenite, Zeolite X, Zeolite Y, ZSM-5, ultra-stable large-pore zeolites, and borosilicate Zeolite AMS-1B, which are all useful in catalyzing the cracking of hydrocarbons. For example, a solid particulate that contains about 30% ZSM-5 and about 70% inert material, such as silica, may form the zeolite 114.

As the active sorbent 212 becomes saturated with the sulfur-containing compounds and is turned into the sulfided sorbent 210 and/or the zeolite 114 becomes inactive, some or all of the mixture 108 is sent to the magnetic separator 106 via the withdrawal pathway 122. The zeolite 114 is non-magnetic or at least less magnetic than the sulfided sorbent 210. In addition, any active sorbent 212 that may be withdrawn from the reactor 104 is also non-magnetic or at least less magnetic than the sulfided sorbent 210 that is loaded with the sulfur-containing compounds. Due to these differences in magnetic properties, the magnetic separator 106 enables separating the mixture 108 withdrawn from the reactor 104 into a first portion 224 and a second portion 226 based on variable magnetism depending on sulfur content of the active and sulfided sorbents 212, 210.

In some embodiments, the magnetic separator 106 receives the mixture 108 withdrawn from the reactor 104 prior to regeneration thereof in a regenerator 228. The magnetic separator 106 thereby divides the mixture 108 into the first portion 224 with the sulfided sorbent 210 and the second portion 226 that is less magnetic than the first portion 224 and contains the zeolite 114 and/or the active sorbent 212. In applications where the mixture 108 contains other magnetic constituents desired to be separated from the active sorbent 212, magnetic separation may occur after regeneration of the sulfided sorbent 210 such that the magnetic separator 106 or another separator may be disposed in a flow path of the mixture 108 between the regenerator 228 and the reactor 104.

An exemplary design depicted for the magnetic separator 106 includes a stationary permanent magnet 230 enclosed in a rotatable non-magnetic stainless steel drum 232 and offset to one side of the drum 232. The mixture 108 from the withdrawal pathway 122 falls onto a surface of the drum 232 with the sulfided sorbent 210 drawn to the surface by a magnetic field of the magnet 230. The zeolite 114 and/or the active sorbent 212 fall by force of gravity through the separator 106 into the second portion 226 since the zeolite 114 and/or the active sorbent 212 are not retained against the drum 232. As the drum 232 rotates, the drum 232 carries the sulfided sorbent 210 past where the zeolite 114 and/or the active sorbent 212 falls to form the second portion 226 and until the magnetic field is reduced due to the offset of the magnet 230. The sulfided sorbent 210 after such selective retention to the drum 232 thus falls from the drum 232 to form the first portion 224 divided from the second portion 226.

Separating the sulfided sorbent 210 from the zeolite 114 enables processing independent of one another the sulfided sorbent 210 and the zeolite 114. Such processing replenishes the mixture 108 within the reactor 104 by recycling at least one of the sulfided sorbent 210 and the zeolite 114. This independent processing permits replacement of only one of either the sulfided sorbent 210 or the zeolite 114 once one becomes deactivated without having to replace both together even though one may be able to be reused. Given expense of changing out the mixture 108, ability to selectively change out only one of the sulfided sorbent 210 or the zeolite 114 with new fresh inventory depending on need provides cost savings over combined replacements of the sulfided sorbent 210 and the zeolite 114. In addition, the separator 106 for some embodiments enables corresponding independent processing of the sulfided sorbent 210 and the active sorbent 212.

During use in the reactor 104, the zeolite 114 becomes inactive due to coke being deposited on the zeolite 114. While accumulation of the coke may be removed to regenerate the zeolite 114, aluminum also leaches out of the zeolite 114 over time causing permanent reduction in activity of the zeolite 114. This dealumination of the zeolite 114 requires periodic replacement of the zeolite 114 with new material.

The sulfided sorbent 210 represents the active sorbent 212 deactivated due to adsorption of the sulfur-containing compounds onto the active sorbent 212. Desorption of the sulfur-containing compounds from the sulfided sorbent 210 regenerates the sulfided sorbent 210 back into the active sorbent 212. In contrast to this temporary deactivation, metallic silicate forming on the active sorbent 212 causes permanent reduction in ability of the active sorbent 212 to adsorb the sulfur-containing compounds. This metallic silicate formation requires periodic replacement of the active sorbent 212 with new material.

However, the zeolite 114 possesses different attrition rates and deactivation rates as compared to the active sorbent 212. The aforementioned independent processing accounts or compensates for such differences. Contents of the first portion 224 may be regenerated and replaced at any time based on conditions specific to the sulfided sorbent 210 regardless of how contents of the second portion 226 are being processed. Likewise, contents of the second portion 226 may be regenerated and replaced at any time based on conditions specific of the zeolite 114 regardless of how contents of the first portion 224 are being processed.

With respect to the second portion 226, a catalyst regeneration pathway 238 directs the zeolite 114 to the regenerator 228 where the zeolite 114 that is deactivated (i.e., coke-loaded) contacts an oxygen-containing regeneration stream such that the coke deposited on the surface of the zeolite 114 is combusted (i.e., "burned off") to thereby regenerate the zeolite 114. The catalyst discard pathway 134 allows for removal of the zeolite 114 once no longer able to be regenerated within the regenerator 228. In some embodiments, a reactor return pathway 242 directs the zeolite 114 and/or the active sorbent 212 back to the reactor 104 during times when only the sulfided sorbent 210 needs regenerated. The processing of the second portion 226 thus refers to what percentage of the second portion 226 at any given time passes through each of the catalyst regeneration pathway 238, the catalyst discard pathway 134, and the reactor return pathway 242.

Regarding the first portion 224 of the mixture 108 divided out by the separator 106, sorbent regeneration pathway 239 directs the sulfided sorbent 210 to the regenerator 228 where the sulfided sorbent 210 contacts the oxygen-containing regeneration stream such that the sulfur loaded onto the sulfided sorbent 210 is converted into sulfur dioxide for removal. At times when all of both the zeolite 114 and the sulfided sorbent 210 are able and desired to be regenerated, a bypass pathway 222 from the reactor 104 to the regenerator 228 may circumvent the separator 106 since the regeneration pathways 238, 239 recombine without any separate processing during such periods of time. A sorbent discard pathway 240 comes from the first portion 224 and permits removal of only the sulfided sorbent 210 from the mixture 108 once the sulfided sorbent 210 approaches a predetermined lifetime within the mixture 108 corresponding to when the sulfided sorbent 210 can no longer be regenerated within the regenerator 228. Any of the sulfided sorbent 210 and/or the zeolite 114 that is removed via the discard pathways 134, 240 may be replaced with new material to maintain a desired balance for the mixture 108 within the reactor 104.

Removal of the mixture 108 from the reactor 104 for any of the foregoing described processing may occur with the system 100 online or offline. Further, the removal may be continuous or batch. For batch processing of the mixture 108, the system 100 may include multiple ones of the reactors 104 operated in swing mode.

A test was conducted to demonstrate ability to separate a mixture such as set forth herein based on magnetism. About 2.0 grams of particles containing about 30% ZSM-5 were mixed with about 2.0 grams of a nickel-containing sorbent loaded with sulfur. A bar magnet was used to separate the mixture into a non-magnetic portion (about 1.75 grams recovered) and a magnetic portion (about 1.5 grams recovered). Upon analysis, the magnetic portion was found to contain the sorbent with greater than 96% purity.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method of processing petroleum, comprising:
    contacting in a reactor a solid particulate mixture with a hydrocarbon-containing feed stream, wherein the solid particulate mixture comprises a sorbent impregnated with a nickel-containing material and a catalyst, wherein the sorbent adsorbs sulfur from the hydrocarbon-containing feed stream, wherein the catalyst comprises a zeolite and causes reactions that increase octane of the hydrocarbon-containing feed stream;
    removing at least part of the solid particulate mixture from the reactor to provide a removed portion of the mixture;
    separating the sorbent from the catalyst within the removed portion by magnetic separation; and
    processing independent of one another the sorbent and the catalyst that are separated, wherein the solid particulate mixture within the reactor is replenished with at least one of the sorbent and the catalyst that is recycled from the removed portion.

2. The method according to claim 1, wherein the processing includes replacing the catalyst from the removed portion with new material supplied to the reactor and recycling the sorbent from the removed portion back to the reactor.

3. The method according to claim 1, wherein the processing includes replacing the sorbent from the removed portion with new material supplied to the reactor and recycling the catalyst from the removed portion back to the reactor.

4. The method according to claim 1, wherein the catalyst is less magnetic than the sorbent.

5. The method according to claim 1, wherein the sorbent further comprises zinc oxide.

6. The method according to claim 1, wherein a sulfur unloaded form of the sorbent is less magnetic than a sulfided form of the sorbent.

7. The method according to claim 1, further comprising regenerating the sorbent to remove sulfur-containing compounds from the sorbent.

8. The method according to claim 1, further comprising regenerating the catalyst to remove coke from the catalyst.

9. The method according to claim 1, further comprising regenerating the catalyst to remove coke from the catalyst and regenerating the sorbent to remove sulfur-containing compounds from the sorbent.

10. The method according to claim 1, wherein a catalyst to sorbent ratio within the mixture is about 1:1.

11. The method according to claim 1, wherein the zeolite comprises ZSM-5.

12. A system for processing petroleum, comprising:
   a reactor containing a solid particulate mixture, wherein the solid particulate mixture comprises a sorbent and a catalyst, wherein the sorbent comprises a nickel-containing material impregnated thereon and is capable of adsorbing sulfur from a hydrocarbon-containing fluid, wherein the catalyst comprises a zeolite and is capable of catalyzing reactions that increase octane of the hydrocarbon-containing fluid;
   a magnetic separator coupled to receive a portion of the solid particulate mixture and separate the sorbent from the catalyst within the portion; and
   processing equipment to replenish the solid particulate mixture within the reactor with at least one of the sorbent and the catalyst that is recycled from the portion, wherein the processing equipment is coupled to the magnetic separator to process independent of one another the sorbent and the catalyst that are separated by the magnetic separator.

13. The system according to claim 12, wherein the zeolite comprises ZSM-5.

14. The system according to claim 13, wherein the sorbent further comprises zinc oxide.

* * * * *